(12) United States Patent
Hsieh et al.

(10) Patent No.: US 8,050,041 B2
(45) Date of Patent: Nov. 1, 2011

(54) CASING ASSEMBLY AND ELECTRONIC DEVICE INCLUDING THE SAME

(75) Inventors: Te-Min Hsieh, Hsichih (TW); Chien-Ming Peng, Hsichih (TW)

(73) Assignee: Wistron NeWeb Corp., Taipei Hsien (TW)

( * ) Notice: Subject to any disclaimer, the term of this patent is extended or adjusted under 35 U.S.C. 154(b) by 511 days.

(21) Appl. No.: 12/354,008

(22) Filed: Jan. 15, 2009

(65) Prior Publication Data

US 2010/0061043 A1 Mar. 11, 2010

(30) Foreign Application Priority Data

Sep. 10, 2008 (TW) ................................ 97216342 U

(51) Int. Cl.
 *H05K 5/00* (2006.01)
(52) U.S. Cl. .................... 361/752; 361/807; 361/810
(58) Field of Classification Search .................. 361/730, 361/752, 796, 797, 800, 807, 810; 211/70.6, 211/174, 207, 209, 210, 215; 312/223.1, 312/223.2
See application file for complete search history.

(56) References Cited

U.S. PATENT DOCUMENTS

| | | | | |
|---|---|---|---|---|
| 3,950,603 A | * | 4/1976 | Brefka | 174/544 |
| 4,652,969 A | * | 3/1987 | Stegenga | 361/694 |
| 5,197,789 A | * | 3/1993 | Lin | 312/223.2 |
| 5,208,734 A | * | 5/1993 | Someno | 361/706 |
| 5,713,647 A | * | 2/1998 | Kim | 312/223.2 |
| D425,866 S | * | 5/2000 | Nagasawa et al. | D13/147 |
| 6,229,699 B1 | * | 5/2001 | Kerrigan et al. | 361/679.6 |
| 2003/0149496 A1 | * | 8/2003 | Johnson | 700/91 |
| 2004/0136224 A1 | * | 7/2004 | Hamer et al. | 365/145 |

* cited by examiner

*Primary Examiner* — Hung S Bui
(74) *Attorney, Agent, or Firm* — Occhiuti Roklicek & Tsao LLP

(57) ABSTRACT

A casing assembly includes a casing and a support seat. The casing has interconnected first and second casing walls located on different sides thereof, and an engaging groove portion extending in a direction perpendicular to that of the first casing wall. The first casing wall is formed with an opening portion communicated with the engaging groove portion. The second casing wall is oriented downwardly and the first casing wall extends uprightly when the casing is disposed in an upright state. The support seat includes a supporting bottom portion for supporting the second casing wall when the casing is in the upright state, and an engaging member connected to the supporting bottom portion. The engaging member has an engaging segment spaced apart from and disposed above the supporting bottom portion for insertion into the engaging groove portion through the opening portion so as to engage the engaging groove portion.

20 Claims, 10 Drawing Sheets

CASING ASSEMBLY AND ELECTRONIC DEVICE INCLUDING THE SAME

CROSS-REFERENCE TO RELATED APPLICATION

This application claims priority of Taiwanese Application No. 097216342, filed on Sep. 10, 2008.

BACKGROUND OF THE INVENTION

1. Field of the Invention

The invention relates to a casing, more particularly to a casing that can be placed uprightly using a support seat.

2. Description of the Related Art

Conventional designs of horizontal placement for many electronic devices can no longer meet current user requirements in terms of space utilization. Therefore, upright placement designs have been devised to enable a user to choose to place an electronic device horizontally or uprightly depending on his/her requirement.

Referring to FIG. 1, R.O.C. Utility Model No. M335216 discloses a structure that utilizes a support seat 12 to enable an electronic device 11 to be placed uprightly. The aforesaid structure utilizes engaging grooves 121 in the support seat 12 to engage an outer frame 111 of the electronic device 11, so that the support seat 12 may be coupled with the outer frame 111 to thereby support the electronic device 11.

However, the electronic device 11 has to be provided with the outer frame 111 in order to be able to couple with the support seat 12 in the aforementioned structure. Therefore, the above structure is not suitable for an electronic device without an outer frame. In addition, the provision of the outer frame 111 increases manufacturing costs.

FIGS. 2 and 3 show another structure that utilizes a support seat 22 to permit mounting of an electronic device 21 in an upright state. In this structure, the support seat 22 is provided with two rows of retaining blocks 221 projecting therefrom. The electronic device 21 can be held in the upright state between the two rows of retaining blocks 221. Furthermore, the electronic device 21 has two opposite upright surfaces respectively provided with recesses 211 (only the recesses 211 in one of the surfaces are shown) for receiving the retaining blocks 221 of the support seat 22, so that the support seat 22 can firmly support the electronic device 21. However, in order for the support seat 22 to hold the electronic device 21 in the upright state, the retaining blocks 221 and the corresponding recesses 211 need to have a certain height and a certain width, so that the electronic device 21 can be held on the support seat 22 in the upright state in a relatively secure manner. The greater the height of the recesses 211, the wider will be the width of the recesses 211. This means that the recesses 211 will occupy a larger area of the upright surfaces of the electronic device 21, will be more obtrusive, and will do more damage to the overall appearance and aesthetic appeal of the electronic device 21.

SUMMARY OF THE INVENTION

Therefore, the object of the present invention is to provide a casing assembly including a casing and a support seat, and an electronic device having the casing assembly. A coupling structure of the casing for coupling the casing to the support seat is disposed at a bottom portion of the casing and is hidden from sight when the casing is placed horizontally.

Accordingly, the casing assembly of the present invention includes a casing and a support seat. The casing has a first casing wall and a second casing wall that are interconnected and that are located on different sides thereof, and at least one engaging groove portion extending in a direction perpendicular to that of the first casing wall. The first casing wall is formed with an opening portion in spatial communication with the engaging groove portion. The opening portion corresponds in number to the engaging groove portion. The second casing wall is oriented downwardly and the first casing wall extends uprightly when the casing is disposed in an upright state. The support seat includes a supporting bottom portion for supporting a lower side of the second casing wall when the casing is in the upright state, and an engaging member connected to the supporting bottom portion. The engaging member corresponds in number to the engaging groove portion. The engaging member has an engaging segment spaced apart from and disposed above the supporting bottom portion for insertion into the engaging groove portion through the opening portion so as to engage the engaging groove portion.

Preferably, the engaging segment includes a support arm having upper and lower surfaces, and an engaging portion projecting from one of the upper and lower surfaces of the support arm. The engaging groove portion is recessed to form an opening. The engaging portion is fitted in the opening when the engaging segment is inserted into the engaging groove portion.

Preferably, the engaging groove portion has an inner top face, an inner bottom face, and an inner end distal from the opening portion. The opening is formed in the inner top face. The inner bottom face is provided with a first protrusion that projects upwardly and that is disposed proximate to the inner end. The engaging portion of the engaging segment projects from the upper surface of the support arm. The engaging segment further has a second protrusion projecting from the lower surface of the support arm. The first protrusion contacts the lower surface of the support arm, and the second protrusion contacts the inner bottom face of the engaging groove portion when the engaging segment is inserted into the engaging groove portion for engagement therewith.

Preferably, the casing includes a first casing body and a second casing body that cooperatively define a receiving space. The first casing wall is provided on the first casing body. The first casing body has spaced apart first and second tabs connected to the first casing wall. The first and second tabs define a space therebetween which is in spatial communication with the opening portion. The first tab has a bottom face defining the inner top face of the engaging groove portion. The second protrusion contacts a top face of the second tab when the engaging segment is inserted into the engaging groove portion.

Preferably, the second casing wall is provided on the second casing body. The first protrusion is formed on an inner wall surface of the second casing wall. The inner wall surface of the second casing wall is formed with a first stepped portion, and a second stepped portion at a level lower than that of the first stepped portion. The first protrusion is disposed on a top face of the second stepped portion. The second tab abuts against the second stepped portion such that the second tab has a top face flush with the top face of the second stepped portion so as to define the inner bottom face of the engaging groove portion when the first casing body is coupled to the second casing body. The first stepped portion defines the inner end of the engaging groove portion. The first tab has a free end that defines the opening with the first stepped portion when the first casing body is coupled to the second casing body.

Preferably, the second casing wall has a plurality of spaced-apart positioning ribs. The positioning ribs define the inner wall surface of the second casing wall.

Preferably, the engaging member further includes a connecting segment extending upwardly from the supporting bottom portion. The engaging segment and the connecting segment are interconnected to form an L-shape.

Preferably, the engaging portion is generally wedge-shaped.

Preferably, the first casing wall is oriented downwardly and the second casing wall extends uprightly when the casing is disposed in a horizontal state.

Preferably, the casing assembly further includes a pushbutton disposed within the casing. The pushbutton has a resilient arm disposed and positioned within the casing, and a securing portion and a press portion connected respectively to two ends of the resilient arm. The press portion is partly exposed from the casing.

The electronic device according to the present invention includes a casing assembly and a circuit board. The casing assembly includes a casing and a support seat. The circuit board is mounted within the casing. Since a description of the casing and the support seat of the casing assembly has been provided heretofore, it will not be repeated herein.

The effect of the present invention resides in that, by means of the arrangement of the engaging groove portions in the casing and the engaging segments of the engaging members of the support seat for engaging the engaging groove portions, the support seat can securely support the casing disposed in the upright state. Moreover, since the engaging segments of the engaging members of the support seat extend transversely through the opening portions in the casing, the size of the opening portions may be limited to be within a certain range and do not have to be too large while maintaining the effect of supporting the casing uprightly on the support seat. Furthermore, since the opening portions are provided only in the first casing wall, when the casing is disposed in the horizontal state, the opening portions are located at the bottom of the casing and are hidden from sight.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

It is noted herein that directional terminologies, such as top, bottom, left, right, front and rear, as used herein are defined in relation to the drawings, and are intended to facilitate description of the present invention rather than limit the scope of the present invention.

Figure 1:
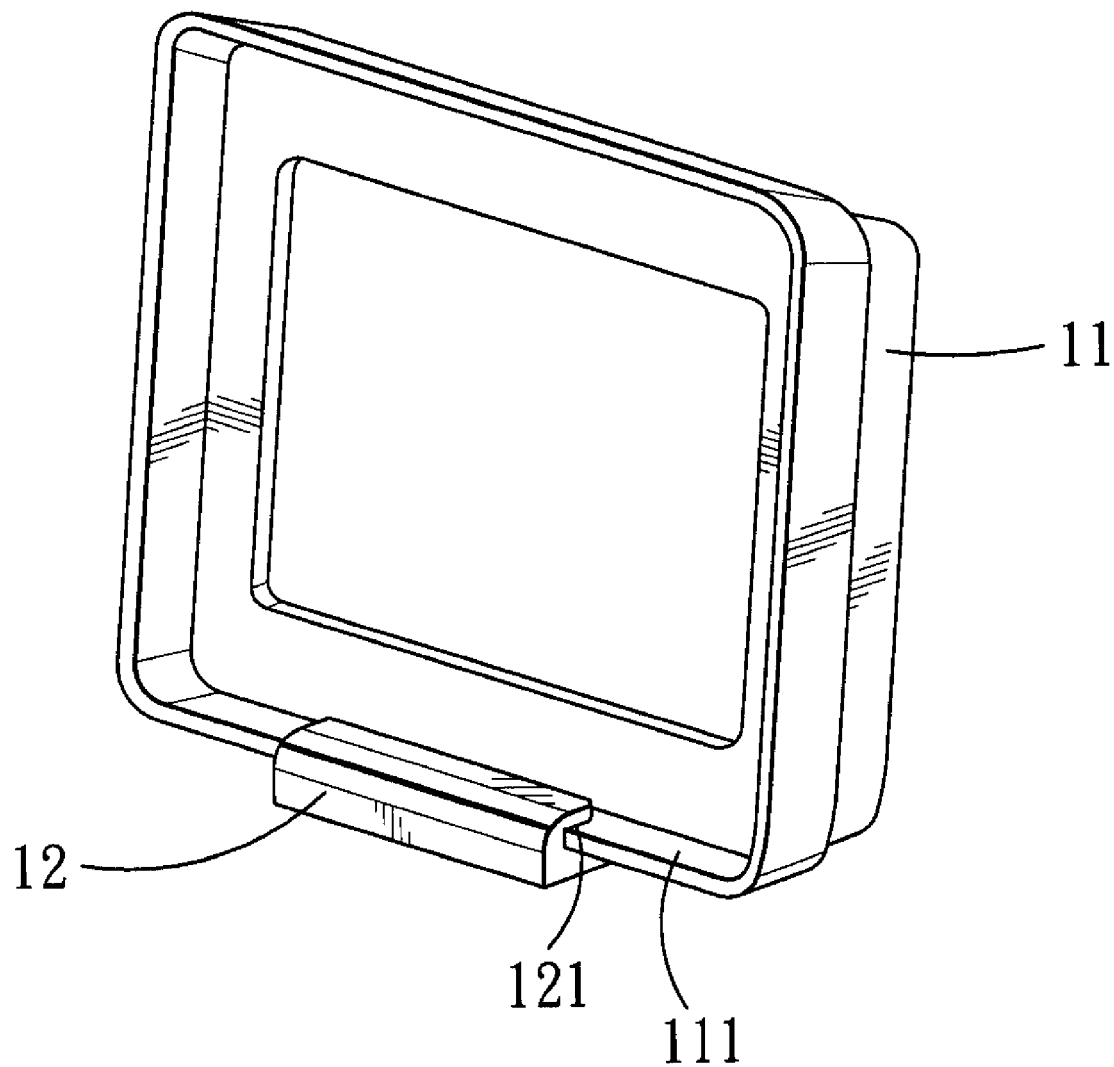
FIG. 1 is a perspective view to illustrate a conventional electronic device placed in an upright state.
Figure 2:
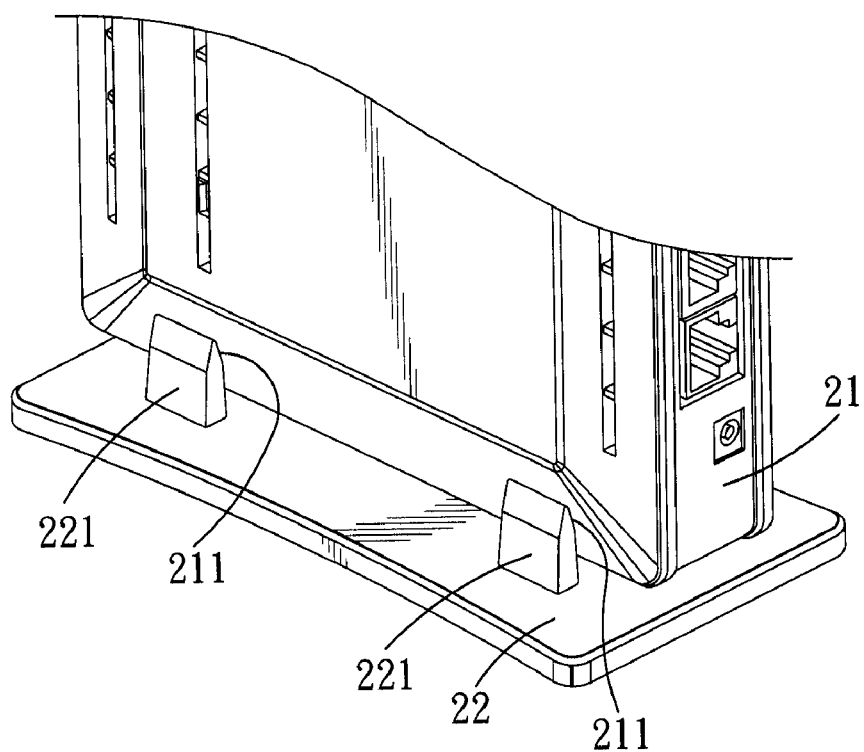
FIG. 2 is a fragmentary perspective view to illustrate another conventional electronic device placed in an upright state.
Figure 3:
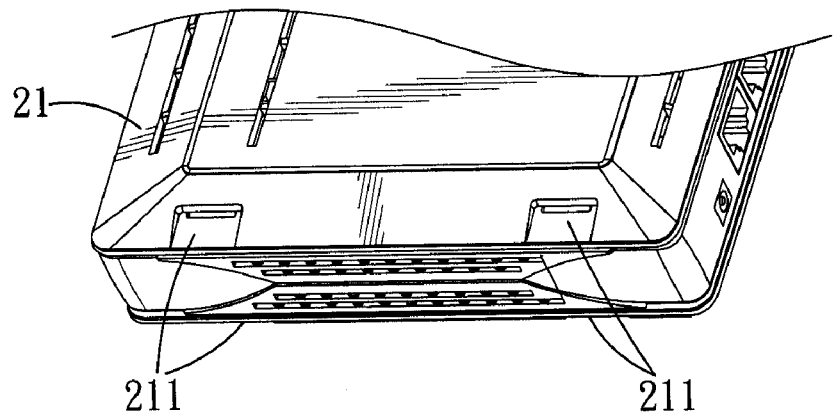
FIG. 3 is a fragmentary perspective view to illustrate the conventional electronic device of FIG. 2 placed in a horizontal state.
Figure 4:
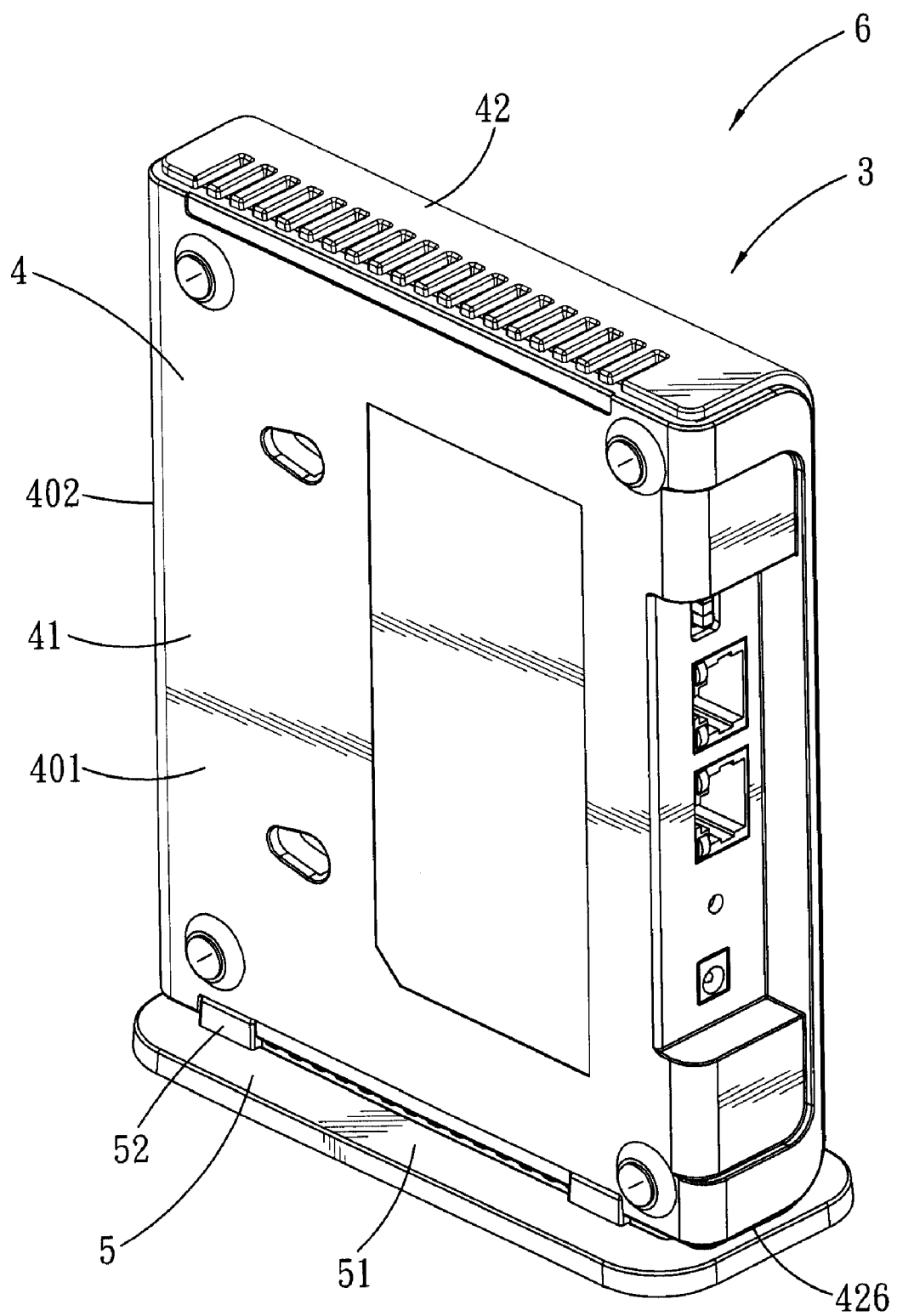
FIG. 4 is a perspective view to illustrate the preferred embodiment of an electronic device according to the present invention.
Figure 5:
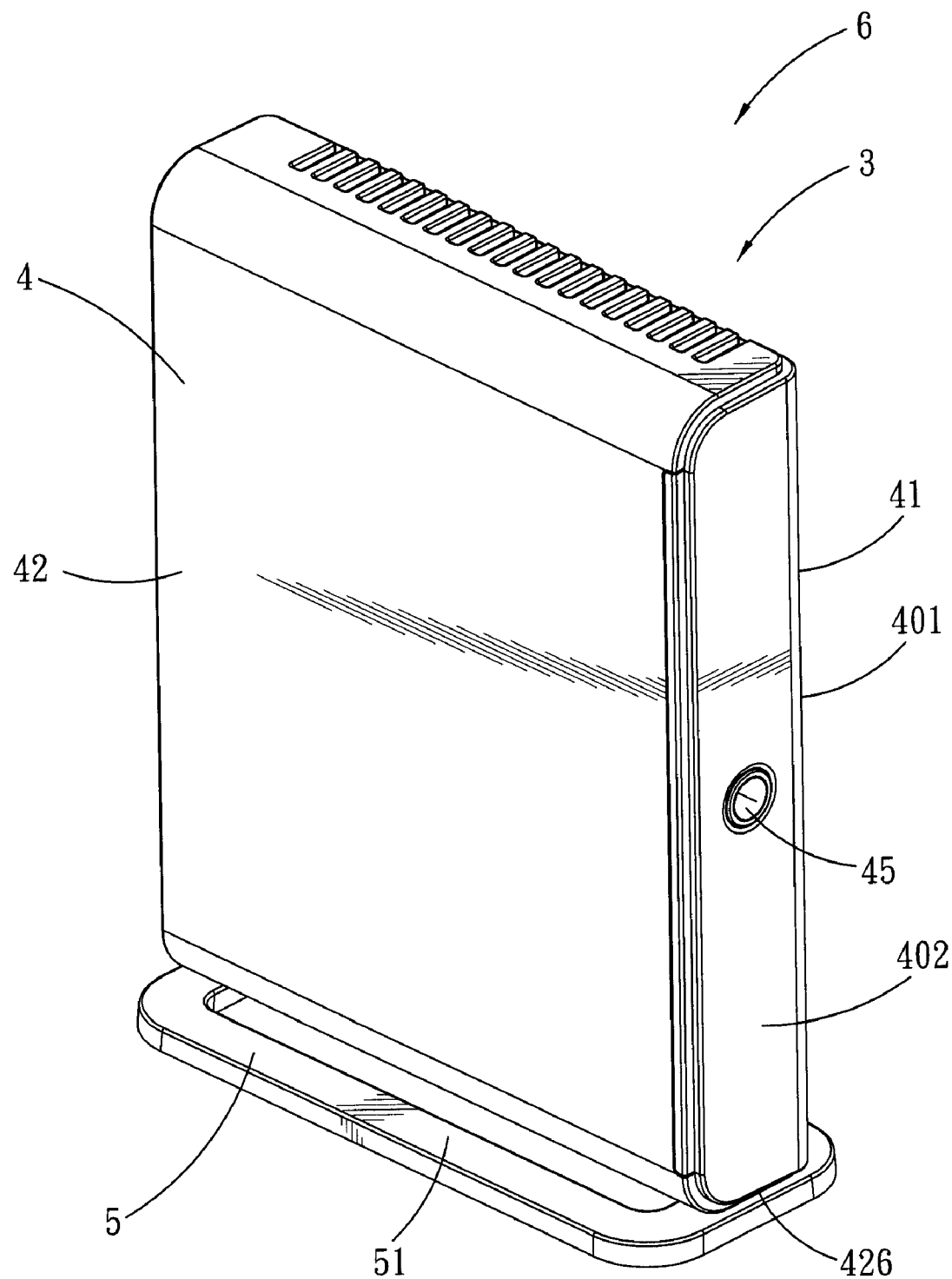
FIG. 5 is a perspective view of the preferred embodiment viewed from another angle.
Figure 6:
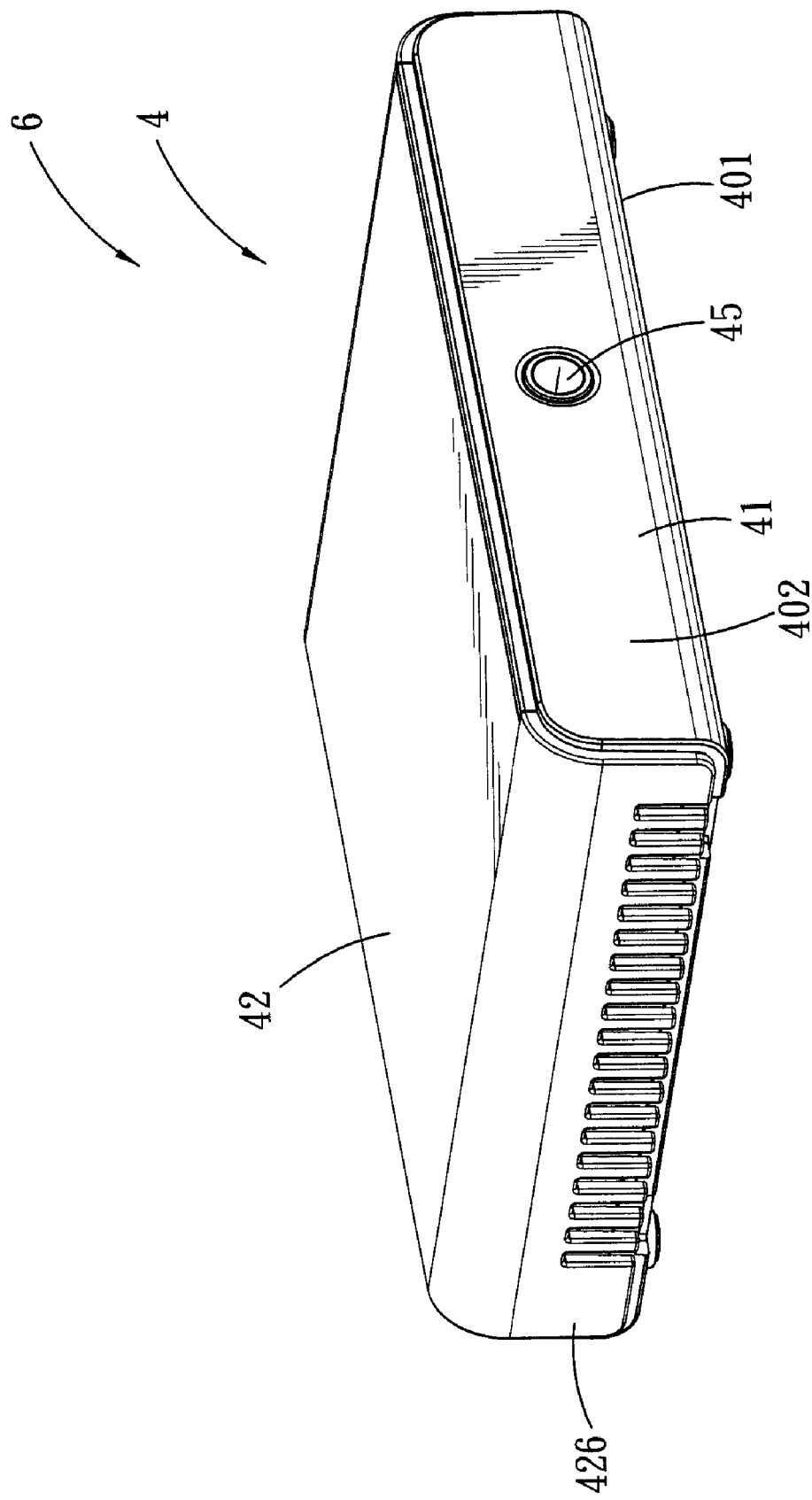
FIG. 6 is a perspective view to illustrate the preferred embodiment in a horizontal state.
Figure 8:
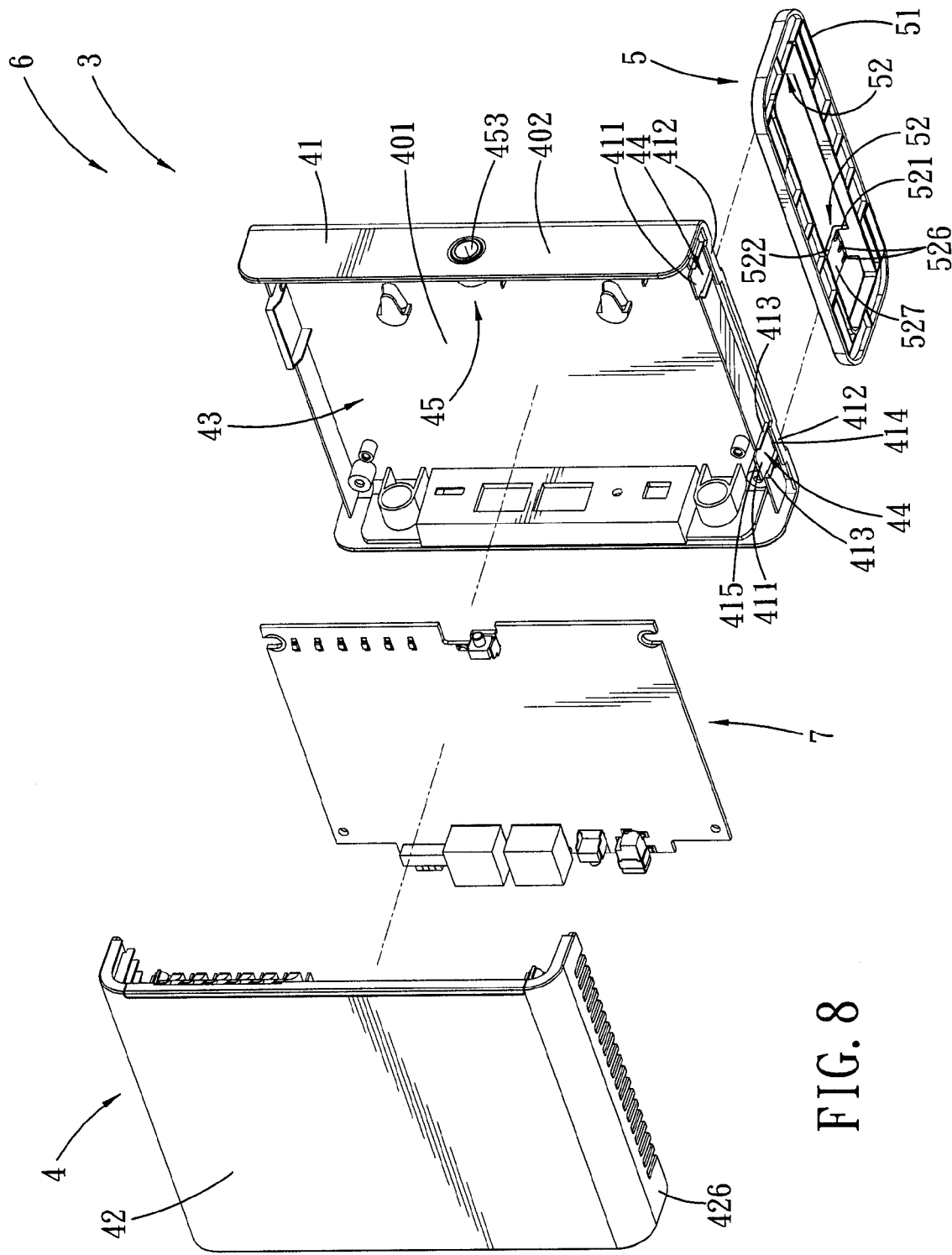
FIG. 8 is an exploded perspective view of the preferred embodiment viewed from another angle.

Referring to FIGS. 4, 5 and 6, the preferred embodiment of an electronic device 6 according to the present invention is shown to include a casing assembly 3 and a circuit board 7 (see FIG. 8). The casing assembly 3 includes a casing 4 and a support seat 5. The circuit board 7 is mounted within the casing 4. In this embodiment, the electronic device 6 is an access point (AP).

The casing 4 can be placed uprightly or horizontally. The casing 4 needs to be used in conjunction with the support seat 5 if it is to be placed uprightly (as shown in FIGS. 4 and 5). The support seat 5 supports a bottom portion of the casing 4 when the casing 4 is placed uprightly, and is placed on a planar surface (not shown) so that the casing 4 is disposed in an upright state. The structures of the support seat 5 and the casing 4 and the way they are coupled will be described hereinbelow. The casing 4 does not require the support seat 5 if it is to be placed horizontally (as shown in FIG. 6). The casing 4 is merely placed horizontally on the planar surface.

Figure 7:
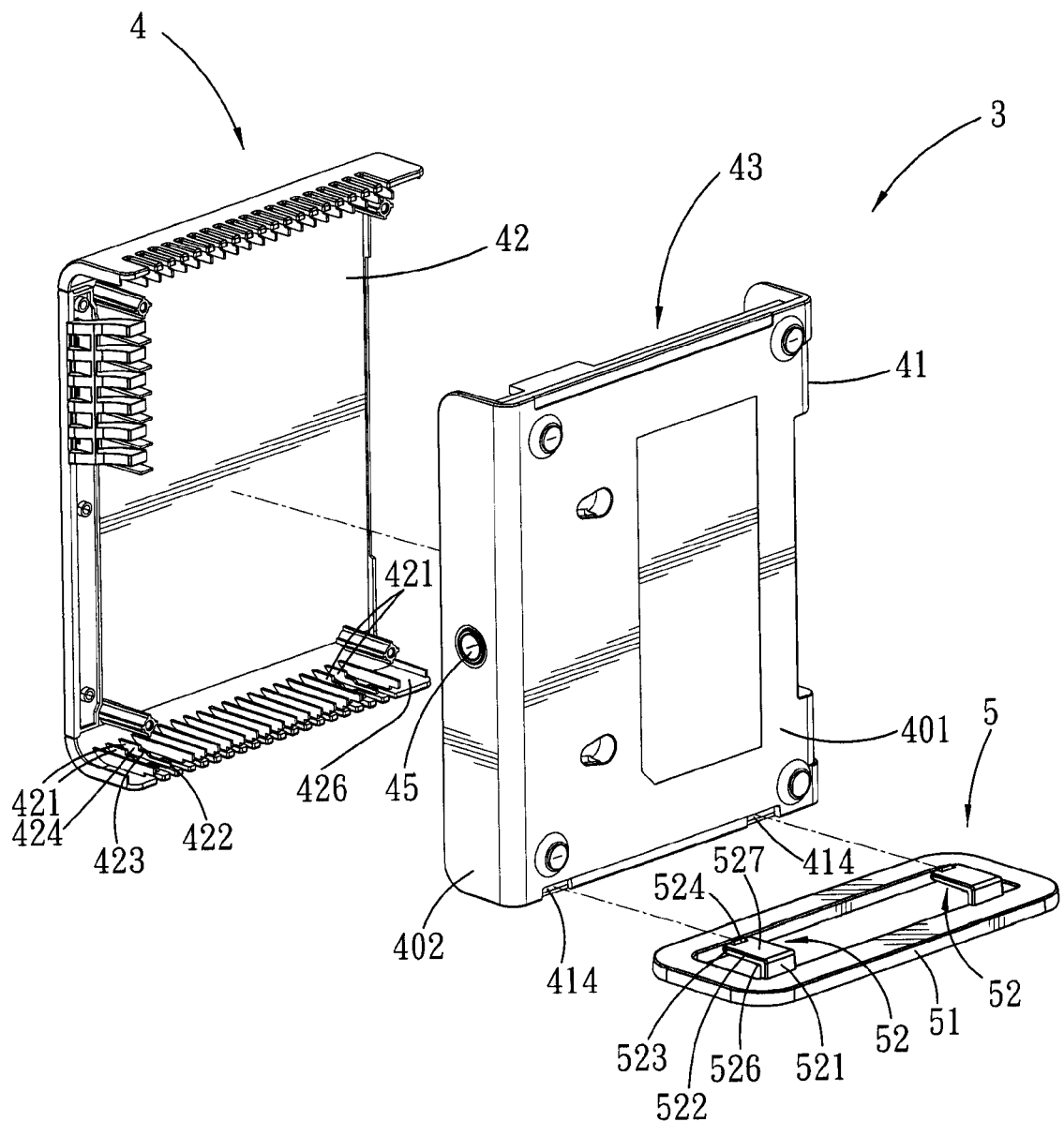
FIG. 7 is an exploded perspective view of the preferred embodiment, with a circuit board of the preferred embodiment omitted.

Referring to FIGS. 5, 6 and 7, the casing 4 includes a first casing body 41 and a second casing body 42 that cooperatively define a receiving space 43. The first casing body 41 has a first casing wall 401 and a third casing wall 402. The second casing body 42 has a second casing wall 426. When the first and second casing bodies 41, 42 are coupled together and the casing 4 is placed horizontally (see FIG. 6), the first casing wall 401 is oriented downwardly, the second casing wall 426 extends in an upright direction and defines one side of the casing 4, and the third casing wall 402 defines a front side of the casing 4. When the casing 4 is placed uprightly, the second casing wall 426 is oriented downwardly and the first casing wall 401 extends in the upright direction.

Figure 10:
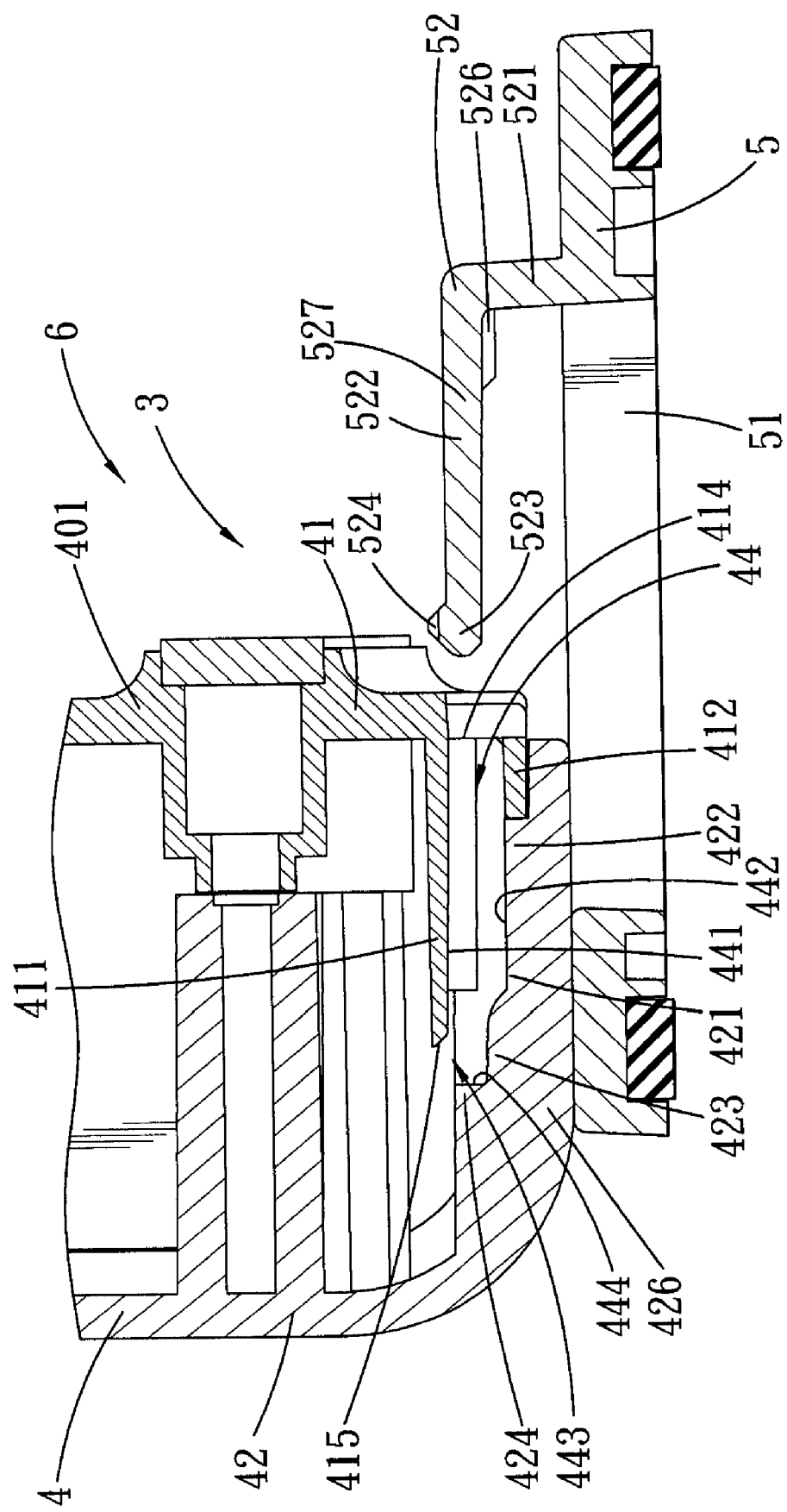
FIG. 10 is a schematic fragmentary sectional view of the preferred embodiment prior to mounting of a casing to a support seat.

Referring to FIGS. 7, 8 and 10, the first casing body 41 further has two opening portions 414 located at the first casing wall 401 proximate to a junction between the first and second casing walls 401, 426, a first tab 411 extending inwardly from an upper edge of each of the opening portions 414, a second tab 412 extending inwardly from a lower edge of each of the opening portions 414, and two spaced apart third tabs 413 extending inwardly and respectively from left and right lateral edges of each of the opening portions 414. The first tab 411 and the second tab 412 at each of the opening portions 414 are spaced apart from each other, the length of inward extension of the first tab 411 being greater than that of the second tab 412.

The second casing wall 426 of the second casing body 42 is formed with a plurality of spaced-apart ribs. Each of the opening portions 414 corresponds to a number of the ribs, which are defined as positioning ribs 421. Each of the positioning ribs 421 has a first stepped portion 424 and a second stepped portion 422 at a level lower than that of the first stepped portion 424. An upwardly projecting first protrusion 423 is formed on a junction between a top face of the second stepped portion 422 and the first stepped portion 424. Referring to FIG. 10, when the first casing body 41 and the second casing body 42 are assembled, the second tab 412 at each of the opening portions 414 is disposed on the second casing wall 426 and abuts against the corresponding second stepped portions 422 so that a top face of the second tab 412 is flush with the top faces of the corresponding second stepped portions 422.

It is additionally noted that, in this embodiment, the second casing wall 426 is formed with the plurality of spaced-apart ribs, and the first stepped portions 424, the second stepped portions 422, and the first protrusions 423 are formed on the ribs. However, in other embodiments of this invention, the second casing wall 426 as a whole may be configured to be a planar wall, with the first stepped portions 424, the second stepped portions 422, and the first protrusions 423 formed directly on an inner wall surface of the second casing wall 426.

When the first casing body 41 and the second casing body 42 are coupled together, the first tab 411, the second tab 412, and the two third tabs 413 at each of the opening portions 414 cooperate with the corresponding positioning ribs 421 to define an engaging groove portion 44 that extends in a direction perpendicular to an extension direction of the first casing wall 401, in which the first tab 411 has a bottom face defining an inner top face 441 of the engaging groove portion 44, the second stepped portions 422 of the positioning ribs 421 are flush with the top face of the second tab 412 so as to cooperatively define an inner bottom face 442 of the engaging groove portion 44, and the first stepped portions 424 define an inner end 444 of the engaging groove portion 44 that is distal from the respective opening portion 414. In addition, an opening 443 is defined between a free end 415 of the first tab 411 at each of the opening portions 414 and the first stepped portions 424 of the corresponding positioning ribs 421.

It is noted that, in this embodiment, the first, second, and third tabs 411, 412, 413 are located on the first casing body 41, and the positioning ribs 421 are located on the second casing body 42. However, depending on design choices, these component parts may be configured to be located on the first casing body 41 or the second casing body 42 or even on other elements (not shown) of the casing 4, as long as an engaging groove portion 44 is defined thereby, and should not be limited to the disclosed embodiment.

When the casing 4 is disposed in the upright state, the support seat 5 is disposed to be coupled to the casing 4 to provide a support function for the casing 4. The support seat 5 includes an annular supporting bottom portion 51 for supporting a lower side of the second casing wall 426, and two engaging members 52 connected to the supporting bottom portion 51. Each of the engaging members 52 has a connecting segment 521 extending upwardly from a top face of the supporting bottom portion 51, and an engaging segment 522 extending transversely from a top edge of the connecting segment 521 for insertion into the respective engaging groove portion 44 through the opening portion 414. The engaging segment 522 and the connecting segment 521 are configured to resemble an L-shape. The engaging segment 522 has a transversely extending support arm 527 with a free end 523, a wedge-shaped engaging portion 524 located at the free end 523 and projecting from an upper surface of the support arm 527, and three second protrusions 526 that project downwardly from a lower surface of the support arm 527 proximate to a junction between the engaging segment 522 and the connecting segment 521. In this embodiment, the second protrusions 526 are defined and formed by a plurality of ribs projecting from the lower surface of the support arm 527.

Figure 11:
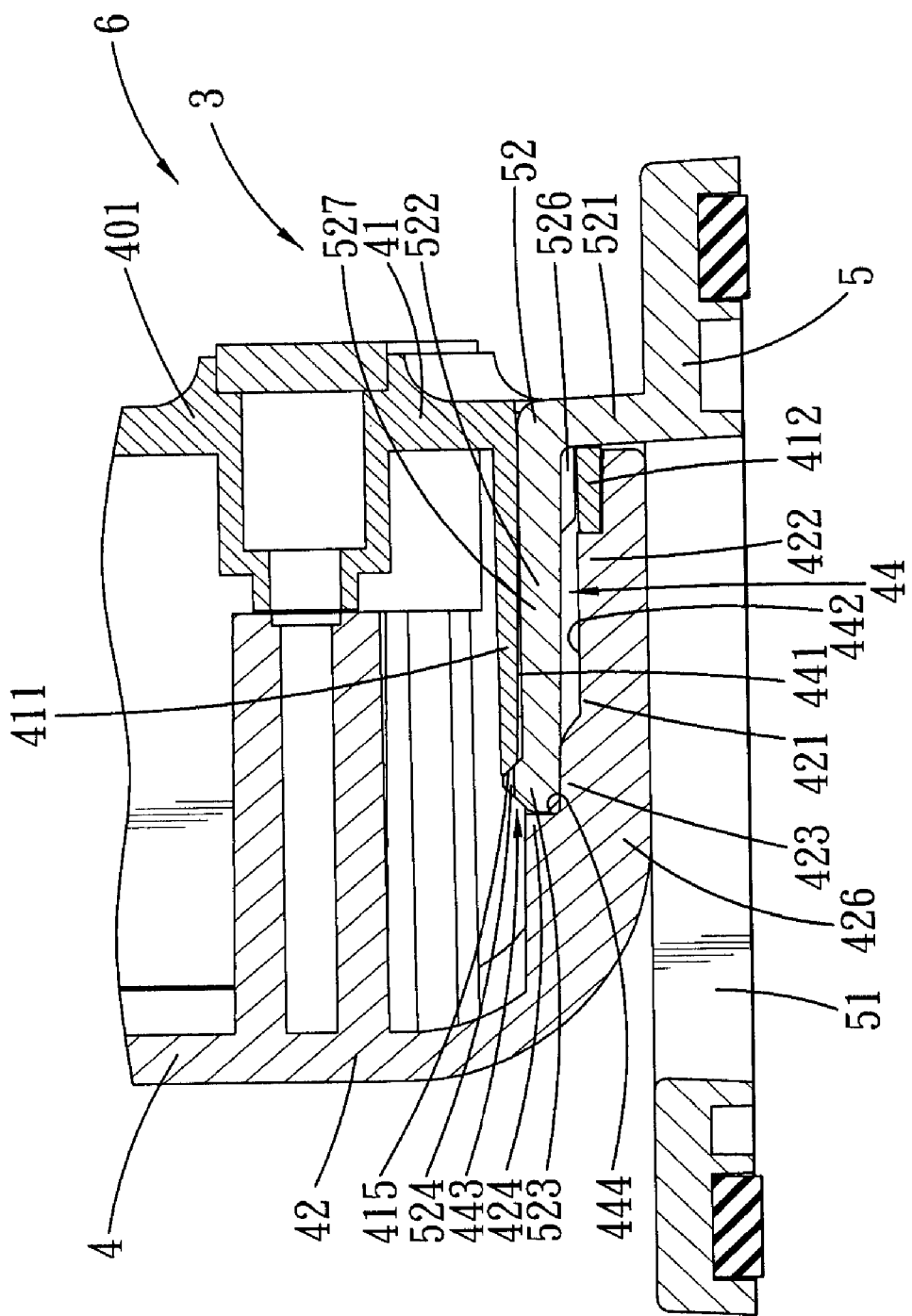
FIG. 11 is a view similar to FIG. 10, illustrating the casing mounted on the support seat.

Referring to FIGS. 10 and 11, upon insertion of the engaging members 52 of the support seat 5 into the two engaging groove portions 44, respectively, the lower surface of the support arm 527 of the engaging segment 522 of each engaging member 52 abuts against the inner bottom face 442 of the corresponding engaging groove portion 44. Subsequently, when the free end 523 of the support arm 527 of each engaging member 52 contacts the corresponding first protrusions 423, the free end 523 of the support arm 527 is brought to move upward along the curved contour of the first protrusions 423, while the engaging portion 524 of each engaging member 52 is brought to urge upwardly against the corresponding first tab 411 so that the latter undergoes elastic deformation, thereby allowing the engaging segment 522 of each engaging member 52 to be fully inserted into the corresponding engaging groove portion 44.

After assembly, the free end 523 of the support arm 527 of each engaging member 52 is located at the inner end 444 of the corresponding engaging groove portion 44, with the upper surface of the support arm 527 abutting against the inner top face 441 (i.e., the bottom face of the corresponding first tab 411), and with the engaging portion 524 located in the opening 443 to thereby engage the free end 415 of the corresponding first tab 411. Moreover, the free end 523 of the support arm 527 of each engaging member 52 has a lower surface abutting against the first protrusions 423 of the corresponding positioning ribs 421, and the second protrusions 526 on the engaging segment 522 of each engaging member 52 abut against the inner bottom face 442 of the corresponding engaging groove portion 44 proximate to the opening portion 414 (i.e., the top face of the corresponding second tab 412), with a clearance present between the lower surface of the support arm 527 and the inner bottom face 442. Therefore, by inserting the engaging segments 522 of the engaging members 52 of the support seat 5 respectively into the engaging groove portions 44, the casing 4 may be supported uprightly with the second casing wall 426 oriented downwardly and the first casing wall 401 extending uprightly.

Figure 9:
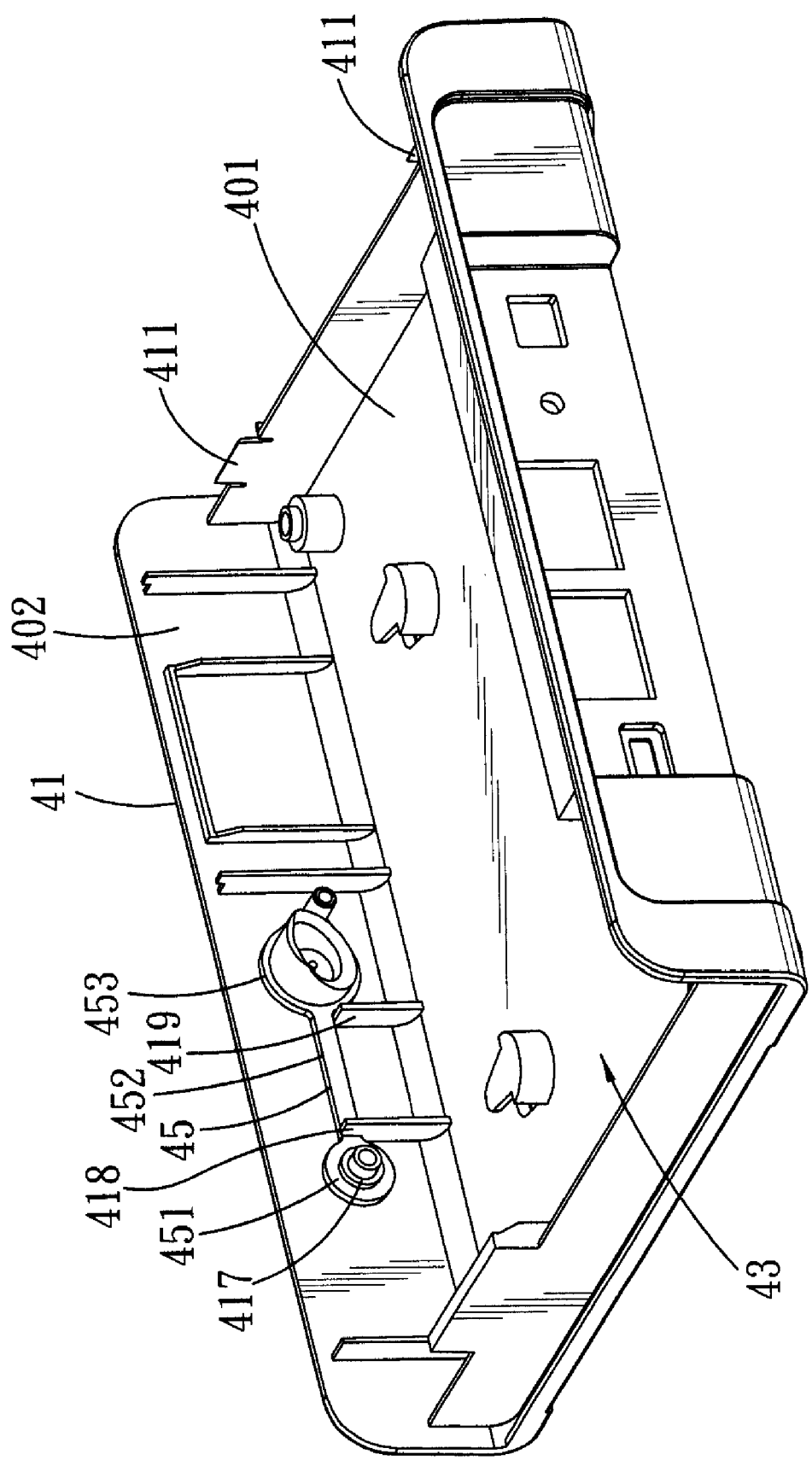
FIG. 9 is a perspective view to illustrate a pushbutton mounted on a first casing body of the preferred embodiment.

Referring to FIGS. 8 and 9, in this embodiment, the casing assembly 3 further includes a pushbutton 45 mounted on the third casing wall 402. The third casing wall 402 has an inner surface provided with a securing post 417 projecting therefrom, and a plate 418 and a plate 419 spaced apart from each other. The pushbutton 45 has a resilient arm 452, and an annular securing portion 451 and a press portion 453 connected respectively to two ends of the resilient arm 452. The end of the resilient arm 452 which is connected to the securing portion 451 is clamped in a notch formed in the plate 418. One side of the end of the resilient arm 452 which is connected to the press portion 453 abuts against the plate 419. The securing portion 451 is fitted around the securing post 417, and the press portion 453 is partly exposed from the casing 4, with an inner side thereof abutting against a switch 71 on the circuit board 7. When the user depresses the press portion 453 from the outside of the casing 4, the press portion 453 displaces inwardly along a direction perpendicular to the third casing wall 402. When the user releases the press portion 453, the press portion 453 is brought to displace outwardly to its original position by virtue of the restoring force of the resilient arm 452.

In sum, with the arrangement of the engaging groove portions 44 of the casing 4 and the engaging segments 522 of the engaging members 52 of the support seat 5 for engaging the engaging groove portions 44, the support seat 5 can securely support the casing 4 disposed in the upright state. Moreover, since the engaging segments 522 of the engaging members 52 of the support seat 5 extend transversely through the opening portions 414 in the casing 4, the size of the opening portions 414 may be limited to be within a certain range and do not have to be too large while maintaining the effect of supporting the casing 4 uprightly on the support seat 5. Furthermore, since the opening portions 414 are provided only in the first casing wall 401, when the casing 4 is disposed in the horizontal state, the opening portions 414 are located at the bottom of the casing 4 and are hidden from sight.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A casing assembly, comprising:
   a casing having a first casing wall and a second casing wall that are interconnected and that are located on different sides thereof, and at least one engaging groove portion extending in a direction perpendicular to that of said first casing wall, said first casing wall being formed with an opening portion in spatial communication with said engaging groove portion, said opening portion corresponding in number to said engaging groove portion, said second casing wall being oriented downwardly and said first casing wall extending uprightly when said casing is disposed in an upright state; and
   a support seat including a supporting bottom portion for supporting a lower side of said second casing wall when said casing is in the upright state, and an engaging member connected to said supporting bottom portion, said engaging member corresponding in number to said engaging groove portion, said engaging member having an engaging segment spaced apart from and disposed above said supporting bottom portion for insertion into said engaging groove portion through said opening portion so as to engage said engaging groove portion.

2. The casing assembly according to claim 1, wherein said engaging segment includes a support arm having upper and lower surfaces, and an engaging portion projecting from one of said upper and lower surfaces of said support arm, said engaging groove portion being recessed to form an opening, said engaging portion being fitted in said opening when said engaging segment is inserted into said engaging groove portion.

3. The casing assembly according to claim 2, wherein said engaging groove portion has an inner top face, an inner bottom face, and an inner end distal from said opening portion, said opening being formed in said inner top face, said inner bottom face being provided with a first protrusion that projects upwardly and that is disposed proximate to said inner end, said engaging portion of said engaging segment projecting from said upper surface of said support arm, said engaging segment further having a second protrusion projecting from said lower surface of said support arm, said first protrusion contacting said lower surface of said support arm and said second protrusion contacting said inner bottom face of said engaging groove portion when said engaging segment is inserted into said engaging groove portion for engagement therewith.

4. The casing assembly according to claim 3, wherein said casing includes a first casing body and a second casing body that cooperatively define a receiving space, said first casing wall being provided on said first casing body, said first casing body having spaced apart first and second tabs connected to said first casing wall, said first and second tabs defining a space therebetween which is in spatial communication with said opening portion, said first tab having a bottom face defining said inner top face of said engaging groove portion, said second protrusion contacting a top face of said second tab when said engaging segment is inserted into said engaging groove portion.

5. The casing assembly according to claim 4, wherein said second casing wall is provided on said second casing body, said first protrusion being formed on an inner wall surface of said second casing wall, said inner wall surface of said second casing wall being formed with a first stepped portion, and a second stepped portion at a level lower than that of said first stepped portion, said first protrusion being disposed on a top face of said second stepped portion, said second tab abutting against said second stepped portion such that said second tab has a top face flush with said top face of said second stepped portion so as to define said inner bottom face of said engaging groove portion when said first casing body is coupled to said second casing body, said first stepped portion defining said inner end of said engaging groove portion, said first tab having a free end that defines said opening with said first stepped portion when said first casing body is coupled to said second casing body.

6. The casing assembly according to claim 5, wherein said second casing wall has a plurality of spaced-apart positioning ribs, said positioning ribs defining said inner wall surface of said second casing wall.

7. The casing assembly according to claim 6, wherein said engaging member further includes a connecting segment extending upwardly from said supporting bottom portion, said engaging segment and said connecting segment being interconnected to form an L-shape.

8. The casing assembly according to claim 7, wherein said engaging portion is generally wedge-shaped.

9. The casing assembly according to claim 8, wherein said first casing wall is oriented downwardly and said second casing wall extends uprightly when said casing is disposed in a horizontal state.

10. The casing assembly according to claim 1, further comprising a pushbutton disposed within said casing, said pushbutton having a resilient arm disposed and positioned within said casing, and a securing portion and a press portion connected respectively to two ends of said resilient arm, said press portion being partly exposed from said casing.

11. An electronic device, comprising:
    a casing assembly including
        a casing having a first casing wall and a second casing wall that are interconnected and that are located on different sides thereof, and at least one engaging groove portion extending in a direction perpendicular to that of said first casing wall, said first casing wall being formed with an opening portion in spatial communication with said engaging groove portion, said opening portion corresponding in number to said engaging groove portion, said second casing wall being oriented downwardly while said first casing wall extending uprightly when said casing is disposed in an upright state, and
        a support seat including a supporting bottom portion for supporting a lower side of said second casing wall when said casing is in the upright state, and an engaging member connected to said supporting bottom portion, said engaging member corresponding in number to said engaging groove portion, said engaging member having an engaging segment spaced apart from and disposed above said supporting bottom portion for insertion into said engaging groove portion through said opening portion so as to engage said engaging groove portion; and a circuit board mounted within said casing.

12. The electronic device according to claim 11, wherein said engaging segment includes a support arm having upper and lower surfaces, and an engaging portion projecting from one of said upper and lower surfaces of said support arm, said engaging groove portion being recessed to form an opening, said engaging portion being fitted in said opening when said engaging segment is inserted into said engaging groove portion.

13. The electronic device according to claim 12, wherein said engaging groove portion has an inner top face, an inner bottom face, and an inner end distal from said opening portion, said opening being formed in said inner top face, said inner bottom face being provided with a first protrusion that projects upwardly and that is disposed proximate to said inner end, said engaging portion of said engaging segment projecting from said upper surface of said support arm, said engaging segment further having a second protrusion projecting from said lower surface of said support arm, said first protrusion contacting said lower surface of said support arm and said second protrusion contacting said inner bottom face of said engaging groove portion when said engaging segment is inserted into said engaging groove portion for engagement therewith.

14. The electronic device according to claim 13, wherein said casing includes a first casing body and a second casing body that cooperatively define a receiving space, said first casing wall being provided on said first casing body, said first casing body having spaced apart first and second tabs connected to said first casing wall, said first and second tabs defining a space therebetween which is in spatial communication with said opening portion, said first tab having a bottom face defining said inner top face of said engaging groove portion, said second protrusion contacting a top face of said second tab when said engaging segment is inserted into said engaging groove portion.

15. The electronic device according to claim 14, wherein said second casing wall is provided on said second casing body, said first protrusion being formed on an inner wall surface of said second casing wall, said inner wall surface of said second casing wall being formed with a first stepped portion, and a second stepped portion at a level lower than that of said first stepped portion, said first protrusion being disposed on a top face of said second stepped portion, said second tab abutting against said second stepped portion such that said second tab has a top face flush with said top face of said second stepped portion so as to define said inner bottom face of said engaging groove portion when said first casing body is coupled to said second casing body, said first stepped portion defining said inner end of said engaging groove portion, said first tab having a free end that defines said opening with said first stepped portion when said first casing body is coupled to said second casing body.

16. The electronic device according to claim 15, wherein said second casing wall has a plurality of spaced-apart positioning ribs, said positioning ribs defining said inner wall surface of said second casing wall.

17. The electronic device according to claim 16, wherein said engaging member further includes a connecting segment extending upwardly from said supporting bottom portion, said engaging segment and said connecting segment being interconnected to form an L-shape.

18. The electronic device according to claim 17, wherein said engaging portion is generally wedge-shaped.

19. The electronic device according to claim 18, wherein said first casing wall is oriented downwardly and said second casing wall extends uprightly when said casing is disposed in a horizontal state.

20. The electronic device according to claim 11, wherein said casing assembly further includes a pushbutton disposed within said casing, said pushbutton having a resilient arm disposed and positioned within said casing, and a securing portion and a press portion connected respectively to two ends of said resilient arm, said press portion being partly exposed from said casing.

* * * * *